United States Patent
Prasad et al.

(10) Patent No.: US 12,039,264 B2
(45) Date of Patent: Jul. 16, 2024

(54) ARTIFICIAL INTELLIGENCE BASED SYSTEM AND METHOD FOR SMART SENTENCE COMPLETION IN MOBILE DEVICES

(71) Applicant: TALENT UNLIMITED ONLINE SERVICES PRIVATE LIMITED, Delhi (IN)

(72) Inventors: Rahul Prasad, Gurugram (IN); Sumegha Yadav, Gurugram (IN); Achyut Saxena, Hathras (IN)

(73) Assignee: TALENT UNLIMITED ONLINE SERVICES PR (IN)

( * ) Notice: Subject to any disclaimer, the term of this patent is extended or adjusted under 35 U.S.C. 154(b) by 16 days.

(21) Appl. No.: 17/851,738

(22) Filed: Jun. 28, 2022

(65) Prior Publication Data
US 2023/0289524 A1  Sep. 14, 2023

(30) Foreign Application Priority Data
Mar. 9, 2022  (IN) .............................. 202211012798

(51) Int. Cl.
*G06F 17/00*  (2019.01)
*G06F 40/166*  (2020.01)
(Continued)

(52) U.S. Cl.
CPC .......... *G06F 40/274* (2020.01); *G06F 40/166* (2020.01); *G06F 40/242* (2020.01); *G06F 40/284* (2020.01)

(58) Field of Classification Search
CPC .... G06F 40/274; G06F 40/166; G06F 40/242; G06F 40/284
See application file for complete search history.

(56) References Cited

U.S. PATENT DOCUMENTS 10,133,739 B2 * 11/2018 Le ............................ G06F 40/56
11,436,414 B2 *  9/2022 Cai .......................... G06F 40/205
(Continued)

FOREIGN PATENT DOCUMENTS

| CN | 112506359 A | * | 3/2021 | .......... G06F 3/0233 |
| CN | 113705223 A | * | 11/2021 | |
| CN | 115803749 A | * | 3/2023 | ............. G06F 40/44 |

OTHER PUBLICATIONS

Sharma, Radhika, Nishtha Goel, Nishita Aggarwal, Prajyot Kaur, and Chandra Prakash. "Next word prediction in hindi using deep learning techniques." In 2019 International conference on data science and engineering (ICDSE), pp. 55-60. IEEE, 2019. (Year: 2019).*

(Continued)

*Primary Examiner* — Laurie A Ries
(74) *Attorney, Agent, or Firm* — Joy S. Goudie

(57) ABSTRACT

The present invention discloses a system and for sentence completion in an edge device. The method comprises receiving input from a user through a user interface (202); scrutinizing a length of the received input by a smart sentence composer; sanitizing the received input text and restricting the length of the input text to be within a preset threshold number; splitting the received input text from into letters/words (208); predicting several words and a cluster of most probable word's indices by the smart sentence composer (210), and wherein the word's indices have a similarity above the preset threshold number; converting the word's indices to words using index to word mapping (212); choosing the word/words in the cluster having highest score for prediction (214); and the words are continuously predicted until the end of token of word index (216), is determined for completing the sentence prediction.

7 Claims, 4 Drawing Sheets

(51) Int. Cl.
  *G06F 40/242* (2020.01)
  *G06F 40/274* (2020.01)
  *G06F 40/284* (2020.01)

(56) References Cited

U.S. PATENT DOCUMENTS

| | | | |
|---|---|---|---|
| 11,475,053 B1* | 10/2022 | Das | G06F 16/3344 |
| 11,861,315 B2* | 1/2024 | Sethi | G06F 3/011 |
| 11,888,870 B2* | 1/2024 | Garyani | H04L 63/1441 |
| 2009/0326916 A1* | 12/2009 | Gao | G06F 40/44 704/4 |
| 2012/0072203 A1* | 3/2012 | Chiu | G06F 40/55 704/2 |
| 2014/0025371 A1* | 1/2014 | Min | G06Q 10/10 704/9 |
| 2016/0371250 A1* | 12/2016 | Rhodes | G06F 3/0237 |
| 2017/0220129 A1* | 8/2017 | Wu | G06F 16/3346 |
| 2018/0101599 A1* | 4/2018 | Arnold | G06F 16/338 |
| 2018/0150744 A1* | 5/2018 | Orr | G06N 3/02 |
| 2018/0157640 A1* | 6/2018 | Chung | G06F 40/56 |
| 2018/0204120 A1* | 7/2018 | Rei | G06N 3/044 |
| 2019/0227980 A1* | 7/2019 | McMahan | G06N 3/044 |
| 2019/0324780 A1* | 10/2019 | Zhu | G06F 16/2365 |
| 2021/0173555 A1* | 6/2021 | Kandur Raja | G06N 3/08 |
| 2021/0405765 A1* | 12/2021 | Jia | G06F 40/274 |
| 2022/0318500 A1* | 10/2022 | Prasad | G06F 40/56 |
| 2023/0029196 A1* | 1/2023 | Huang | G06F 40/56 |

OTHER PUBLICATIONS

Xu, Mengwei, Feng Qian, Qiaozhu Mei, Kang Huang, and Xuanzhe Liu. "Deeptype: On-device deep learning for input personalization service with minimal privacy concern." Proceedings of the ACM on Interactive, Mobile, Wearable and Ubiquitous Technologies 2, No. 4 (2018): 1-26. (Year: 2018).*

* cited by examiner

ARTIFICIAL INTELLIGENCE BASED SYSTEM AND METHOD FOR SMART SENTENCE COMPLETION IN MOBILE DEVICES

BACKGROUND

Technical Field

The present invention is generally related to a field of mobile applications for text generation such as sentence completion. The present invention is particularly related to a system and method for Indic macaronic smart sentence completion using Recurrent Neural Networks (RNN). The present invention is more particularly related to an artificial intelligence-based system and method for smart sentence completion using RNNs (Recurrent Neural Networks) with sub word information in edge devices like mobile devices with restricted memory.

Description of the Related Art

Computers and other electronic devices such as mobile phones, laptops and tablets are widely used for text-based communication in the connected world. Now a days, various communication devices with applications are available to facilitate staying connected with friends, family, and professional colleagues. To aid a user in typing quickly and accurately, many of the communication applications incorporate features for word completion or text prediction. Word completion, or auto complete, is a feature in a communication or messaging application which predicts the rest of a word a user is typing based on the first letters typed. Word completion speeds up human-computer interactions by correctly predicting words being, typed. Furthermore, Context completion is a text editor feature, similar to word completion, which completes words (or entire phrases) based on the current context and context of other similar words within the same document, or within some training data set. An advantage of context completion over word completion is the ability to predict anticipated words more precisely and even with no initial letters.

Moreover, there are various applications which help users complete text entry by suggesting words that are consistent with text already entered by the user. For instance, the words "Month", "Money" or "Monopoly" may be suggested in response to a user typing "Mon". A common methodology generates suggestions on the frequency of word occurrence within an active language. Essentially, available technology helps to flip through a dictionary of available words and suggest the most commonly occurring words within the dictionary that match the already entered text. However, the most interfaces have limited space for suggestions and the word that is actually typed by the user, is often not figured in the suggestions provided. Moreover, the existing methods do not consider whether the suggested words make grammatical sense in the available context. Additionally, the existing methods generally use n-grams (n=5, usually) to suggest/predict the words, so the context goes on up to the length of n-grams selected.

A literature review for the existing methods offers capability of sentence completion and even go on to write an essay, poem etc., which is collectively called as Text Generation, are all Transformer-based architectures. Transformer-based architectures such as GPT-2, GPT-3, BERT etc., offer models, which are used for Text Generation. However, with all these technologies around, one major drawback of these architectures is that it is almost impossible to deploy them in edge devices, i.e., devices with restricted RAM (<2-3 GB). The smallest variant of the trained GPT-2 takes up 500 MBs of storage to store all of its parameters. With such hug sizes it is nearly impossible to deploy such architectures in mobile devices.

Hence, there is a need for a system architecture and method, for predicting word/words to complete a text being written by a user of a mobile device or edge devices in a smart way. There is also a need for a system and method for improving a typing experience of the user by displaying contextualized words, thereby completing the sentence being typed by the user. Still further, there is a need for a system and method comprising fewer parameters, such that the system is easily deployed/implemented in edge devices or mobile devices yet further there is a need for an artificial intelligence (AI) based system architecture for completing sentences with word prediction using a single layer Bi-LSTM encoder-decoder architecture.

The above-mentioned shortcomings, disadvantages and problems are addressed herein, and which will be understood by reading and studying the following specification.

OBJECTIVES OF THE EMBODIMENTS

The primary objective of the embodiments herein is to provide an AI based system and method for smart Indian Macaronic sentence completion using RNNs (Recurrent Neural Networks) with sub word information in edge devices like mobile devices with restricted memory.

Another objective of the embodiments herein is to provide a system and method for smart sentence completion by means of an architecture for predicting word/words to complete a text being written by a user of a mobile device.

Yet another object of the embodiments herein is to provide a system and method for improving a typing experience of the user by displaying contextualized words, thereby completing the sentence being typed by the user.

Yet another object of the embodiments herein is to provide a system and method, that is easily deployed or implemented in mobile devices.

Yet another object of the embodiments herein is to provide a system and method of lightweight architecture encompassing reduced size and latency requirement to be deployed in mobile devices.

Yet another object of the embodiments herein is to provide a system and method architecture which gives long contextualized predictions.

Yet another object of the embodiments herein is to provide a system and method, that which can maintain grammatical sanity.

Yet another object of the embodiments herein is to provide a system and method including personalized/customized spellings depending upon the behavior of the user.

Yet another object of the embodiments herein is to provide a system and method comprising personalized/customized dictionary to offer personalized experience while typing by the user.

Yet another object of the embodiments herein is to provide a system and method, which deals with Indic macaronic languages such as Hinglish (English-Hindi), Banglish (English-Bangla) depending upon the behaviour of the user.

These and other objects and advantages of the present invention will become readily apparent from the following detailed description taken in conjunction with the accompanying drawings.

SUMMARY

The various embodiments herein provide an exemplary mobile device for smart sentence completion. The exemplary mobile device is a device with limited memory RAM (<2-3 GB). The exemplary mobile device comprises plurality of components responsible for prediction of smart sentence completion. The plurality of components includes a user interface, processing unit and display unit. The user interface enables the user to interact with the mobile device through keyboard. The keyboard includes either physical keyboard or touchscreen. The user may use keyboard to input information and instructions into the mobile device. The layout of the keyboard supports generally English language. Although, the layout of the keyboard is in English language, the user has the provision to use the keyboard in English to enter Indic-Macaronic language. The Indic-Macaronic language includes Hinglish (English-Hindi), Banglish (English-Bangla) etc. Further, the processing unit of the exemplary mobile device performs various processing tasks, including control of the overall operation of the mobile device. The processing unit includes smart sentence composer, persistent storage, CPU, memory, network and GPU. The smart sentence composer further includes personalized dictionary and predictive text algorithm. The personalized dictionary maintains dictionary type structure and includes frequently used words, phrases of the user on mobile device. The predictive text algorithm utilizes the preference from the personalized dictionary, which includes most frequently used words of the respective user on mobile device to predict a user preferred contextualized sentence. Further, the smart sentence composer works in tandem with CPU, GPU and memory in order to achieve the desired latency requirement. The display unit displays one or more contextualized sentence based on the user behaviour.

According to one embodiment herein, the smart sentence composer, with the help of personalized dictionary provides a unique personalized experience to the user. In addition, the smart sentence composer predicts a cluster having similar words, wherein similar words includes both syntax and semantics. For instance, to the input "How" by the user the smart sentence composer predicts a cluster [are, to, much, is] and among the cluster the highest probable word is chosen. Furthermore, the smart sentence composer is embedded within the persistent storage, wherein the persistent storage retains the data.

According to one embodiment herein, when the user wants to give input in Indic-Macaronic language the predictive text algorithm of the smart sentence composer utilizes the preference from the personalized dictionary to give most frequently used words by the user on mobile device. For instance, to the input "Kahan ja" by the user the smart sentence composer predicts a cluster [raha, rha, rape, rani] and among the cluster if the most frequently used word in user's personalized dictionary is "rha", then even if "raha" has a higher rank "rha" will be displayed.

According to one embodiment herein, the smart sentence composer will store the commonly used words/sentences and rank them according to the frequency of usage of words/sentences by the user.

According to one embodiment herein, the smart sentence composer includes a language model to maintain grammatical sanity to improve user's typing experience.

According to one embodiment herein, the latency requirement of smart sentence composer is of <50 ms for prediction. Furthermore, the smart sentence composer utilizes <7 MB memory.

According to one embodiment herein, a method for smart sentence completion by means of smart sentence composer comprising the steps of receiving input from a user through a user interface, wherein the user interface is a keyboard comprising English/English-Hindi layout. Scrutinizing the length of the input received from the user through the user interface by smart sentence composer, such that if the length of the input is greater that one word the predictive text algorithm of smart sentence composer proceeds to the next step, if not the predictive text algorithm goes back to the previous step of requesting the input from the user. Sanitizing the input text received from the user and restricting the maximum length of the input text to less than n, wherein n is the maximum length of the input the user can provide. The restriction of maximum length of the input from the user is decided according to optimized inference times. Splitting the input from the user into letters/words. Predicting the word/words by the smart sentence composer, wherein the smart sentence composer predicts cluster of most probable word's indices. The cluster consist of word's indices, such that the word's indices have a similarity above a decided threshold. Furthermore, the method for sentence completion includes converting the word's indices to words using index to word mapping. Choosing the word/word's indices in the cluster having highest score for prediction. The frequently used word/words are present in personalized dictionary of the smart sentence composer. While choosing the word/words those word/words present in the personalized dictionary is given preference over other. On determining the end of token of word index by the predictive text algorithm of the smart sentence composer. If yes, then the predictive text algorithm proceeds to the final step of completing the sentence prediction. If not, the predictive text algorithm prompts the word/words appended with input by the user to the step of text tokenization or sanitizing the input text.

According to one embodiment herein, the personalized dictionary of the smart sentence composer provides a unique personalized experience to the user. In addition, the smart sentence composer predicts a cluster having similar words, wherein similar words includes both syntax and semantics. For instance, to the input "How" by the user the smart sentence composer predicts a cluster [are, to, much, is] and among the cluster the highest probable word is chosen. In addition, when the user gives the input in Indic-Macaronic language the predictive text algorithm of the smart sentence composer utilizes the preference from the personalized dictionary to give most frequently used words by the user. For instance, to the input "Kahan ja" by the user the smart sentence composer predicts a cluster [raha, rha, rahe, rahi] and among the cluster if the most frequently used word in user's personalized dictionary is "rha", then even if "raha" has a higher rank "rha" will be displayed.

According to one embodiment herein, the smart sentence composer comprises an in-built language module. The language module possesses an in-built intelligence to validate the sentences with correct grammar structure. In order to validate the correct grammar sentences, the sentences were tagged by a team of manual annotators. The annotators tagged the sentences, which is grammatically correct and also corrected the cases where they found there was some error both syntax and semantics. Furthermore, after annotation the language module were tested and improvised to understand the word morphology, sentence structure and language nuances. The improvised language module is then embedded in the dense layer of smart sentence composer. Therefore, the output from the smart sentence composer passed through the dense layer gave a higher probability to the n-grams/sentences that are deemed fit grammatically.

From the foregoing discussion, it is apparent that the system and method for smart sentence completion can be implemented in on-device support for sentence completion across all messaging, chatting and all those platforms which require one to type and maintain longer context. Although, there exist word prediction and suggestions, sentence completion involves maintaining longer context and predicting multiple words, in an attempt to complete the sentence. Further, the system and method for smart sentence completion can be used in mobile device with reduced size about <5 MB and latency requirement 50-60 ms. Hence, the model architecture for smart sentence completion can handle long context and yet be light weight. Furthermore, the system and method for smart sentence completion finds application in various textual and visual communication medium, such as chatting applications, virtual text input method such as keyboard, social networking applications and operating systems.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Figure 1:
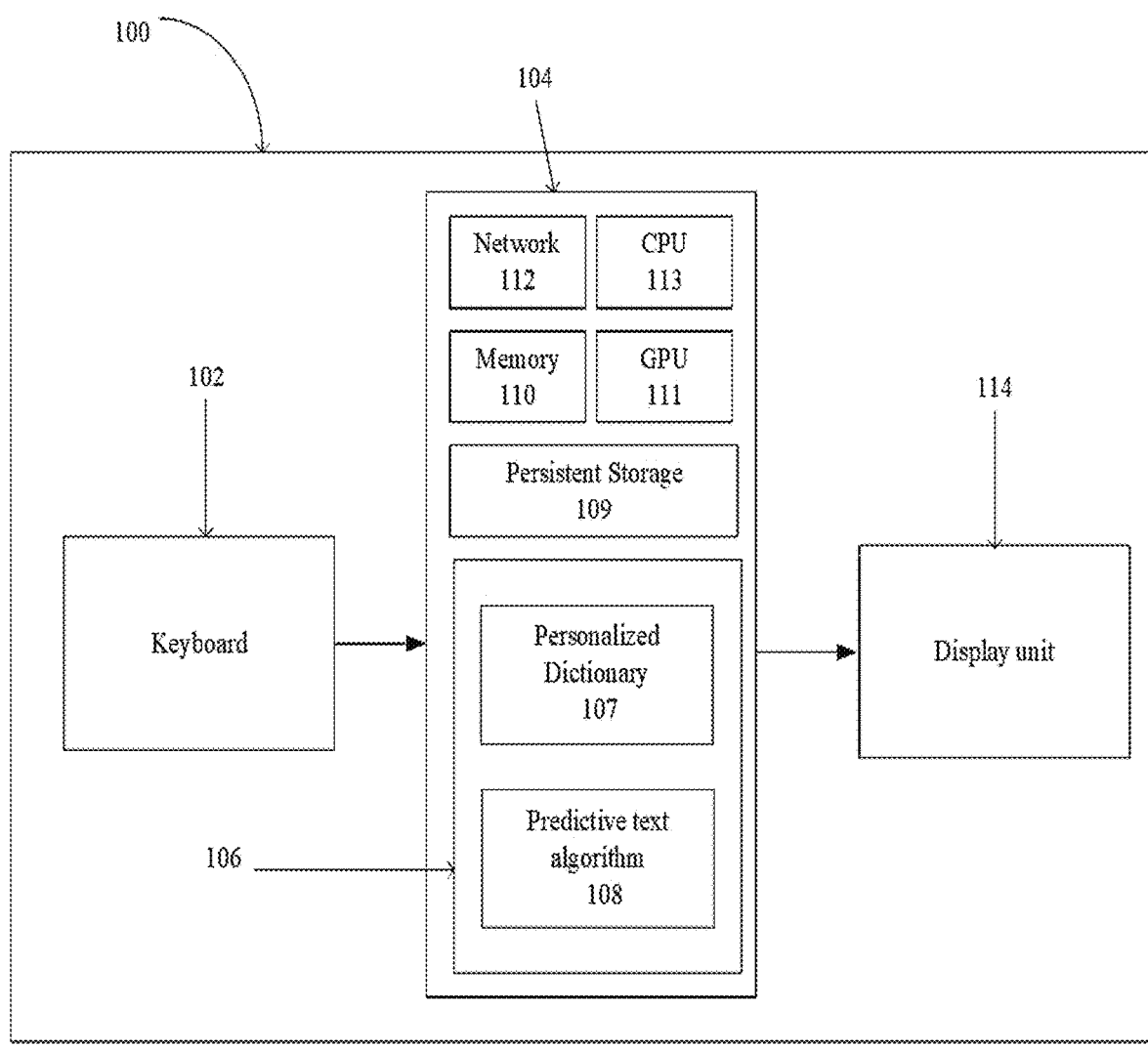
FIG. 1 illustrates a block diagram for an AI based system for smart sentence prediction, according to an embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide an exemplary mobile device for smart sentence completion. The exemplary mobile device is a device with limited memory RAM (<2-3 GB). The exemplary mobile device comprises plurality of components responsible for prediction of smart sentence completion. The plurality of components includes a user interface, processing unit and display unit. The user interface enables the user to interact with the mobile device through keyboard. The keyboard includes either physical keyboard or touchscreen. The user may use keyboard to input information and instructions into the mobile device. The layout of the keyboard supports generally English language. Although, the layout of the keyboard is in English language, the user has the provision to use the keyboard in English to enter Indic-Macaronic language. The Indic-Macaronic language includes Hinglish (English-Hindi), Banglish (English-Bangla) etc. Further, the processing unit of the exemplary mobile device performs various processing tasks, including control of the overall operation of the mobile device. The processing unit includes smart sentence composer, persistent storage, CPU, memory, network and GPU. The smart sentence composer further includes personalized dictionary and predictive text algorithm. The personalized dictionary maintains dictionary type structure and includes frequently used words, phrases of the user on mobile device. The predictive text algorithm utilizes the preference from the personalized dictionary, which includes most frequently used words of the respective user on mobile device to predict a user preferred contextualized sentence. Further, the smart sentence composer works in tandem with CPU, GPU and memory in order to achieve the desired latency requirement. The display unit displays one or more contextualized sentence based on the user behavior.

According to one embodiment herein, the smart sentence composer, with the help of personalized dictionary provides a unique personalized experience to the user. In addition, the smart sentence composer predicts a cluster having similar words, wherein similar words includes both syntax and semantics. For instance, to the input "How" by the user the smart sentence composer predicts a cluster [are, to, much, is] and among the cluster the highest probable word is chosen. Furthermore, the smart sentence composer is embedded within the persistent storage, wherein the persistent storage retains the data.

According to one embodiment herein, when the user wants to give input in Indic-Macaronic language the predictive text algorithm of the smart sentence composer utilizes the preference from the personalized dictionary to give most frequently used words by the user on mobile device. For instance, to the input "Kahan ja" by the user the smart sentence composer predicts a cluster [raha, rha, rape, rahi] and among the cluster if the most frequently used word in user's personalized dictionary is "rha", then even if "raha" has a higher rank "rha" will be displayed.

According to one embodiment herein, the smart sentence composer will store the commonly used words/sentences and rank them according to the frequency of usage of words/sentences by the user.

According to one embodiment herein, the smart sentence composer includes a language model to maintain grammatical sanity to improve user's typing experience.

According to one embodiment herein, the latency requirement of smart sentence composer is of <50 ins for prediction. Furthermore, the smart sentence composer utilizes <7 MB memory.

According to one embodiment herein, a method for smart sentence completion by means of smart sentence composer comprising the steps of receiving input from a user through a user interface, wherein the user interface is a keyboard comprising English/English-Hindi layout. Scrutinizing the length of the input received from the user through the user interface by smart sentence composer, such that if the length of the input is greater that one word the predictive text algorithm of smart sentence composer proceeds to the next step, if not the predictive text algorithm goes back to the previous step of requesting the input from the user. Sanitizing the input text received from the user and restricting the maximum length of the input text to less than n, wherein n is the maximum length of the input the user can provide. The restriction of maximum length of the input from the user is decided according to optimized inference times. Splitting the input received from the user into letters/words. Predicting the word/words by the smart sentence composer, wherein the smart sentence composer predicts cluster of most probable word's indices. The cluster consist of word's indices, such that the word's indices have a similarity above a decided threshold. Furthermore, the method for sentence completion includes converting the word's indices to words using index to word mapping. Choosing the word/words in the cluster having highest score for prediction. The frequently used word/words are present in personalized dictionary of the smart sentence composer. While choosing the word/words those word/words present in the personalized dictionary is given preference over other. Further, continuously predicting the words until, determining the end of token of word index by the predictive text algorithm of the smart sentence composer. If yes, then the predictive text algorithm proceeds to the final step of completing the sentence prediction. If not, the predictive text algorithm prompts the word/words appended with input by the user to the step of text tokenization or sanitizing the input text.

According to one embodiment herein, the personalized dictionary of the smart sentence composer provides a unique personalized experience to the user. In addition, the smart sentence composer predicts a cluster having similar words, wherein similar words includes both syntax and semantics. For instance, to the input "How" by the user the smart sentence composer predicts a cluster [are, to, much, is] and among the cluster the highest probable word is chosen. In addition, when the user gives the input in Indic-Macaronic language the predictive text algorithm of the smart sentence composer utilizes the preference from the personalized dictionary to give most frequently used words by the user. For instance, to the input "Kahan ja" by the user the smart sentence composer predicts a cluster [raha, rha, rape, rahi] and among the cluster if the most frequently used word in user's personalized dictionary is "rha", then even if "raha" has a higher rank "rha" will be displayed.

According to one embodiment herein, the smart sentence composer comprises an in-built language module. The language module has an in-built intelligence to validate the sentences with correct grammar structure. In order to validate the correct grammar sentences, the sentences were tagged by a team of manual annotators. The annotators tagged the sentences, which is grammatically correct and also corrected the cases where they found there was some error both syntax and semantics. Furthermore, after annotation the language module are tested/evaluated and improvised to understand the word morphology, sentence structure and language nuances. The improvised language module is then embedded in the dense layer of smart sentence composer. Therefore, the output from the smart sentence composer passed through the dense layer gave a higher probability to the n-grams/sentences that are deemed fit grammatically.

FIG. 1 illustrates a block diagram for an exemplary mobile device, according to one embodiment herein. With regard to FIG. 1, represents an exemplary mobile device 100 comprising plurality of components responsible for prediction of smart sentence completion. The plurality of components includes a user interface 102, processing unit 104 and a display unit 114. The user interface 102 includes a keyboard. The user interface 102 enables the user to interact with the mobile device 100 through keyboard. The keyboard includes either physical keyboard or touchscreen. The user may use keyboard to input information and instructions into the mobile device 100. The layout of the keyboard supports generally English language. Although, the layout of the keyboard is in English language, the user has the provision to use the keyboard in English to enter Indic-Macaronic language. The Indic-Macaronic language includes Hinglish (English-Hindi), Banglish (English-Bangla) etc. Further, the processing unit 104 of the exemplary mobile device 100 performs various processing tasks, including control of the overall operation of the mobile device 100. The processing unit 104 includes smart sentence composer 106, persistent storage 109, memory 110 GPU 111, network 112 and CPU 113. The smart sentence composer 106 further includes personalized dictionary 107 and predictive text algorithm 108. The personalized dictionary 107 maintains dictionary type structure and includes frequently used words, phrases of the user on mobile device 100. The predictive text algorithm 108 utilizes the preference from the personalized dictionary 107, which includes most frequently used words of the respective user on mobile device 100 to predict a user preferred contextualized sentence. Further, the smart sentence composer 106 works in tandem with CPU 113, GPU 111 and memory 110 in order to achieve the desired latency requirement. Moreover, the network 112 enables the mobile device 100 to connect to the internet. The display unit 114 displays one or more contextualized sentence based on the user behavior.

Figure 2:
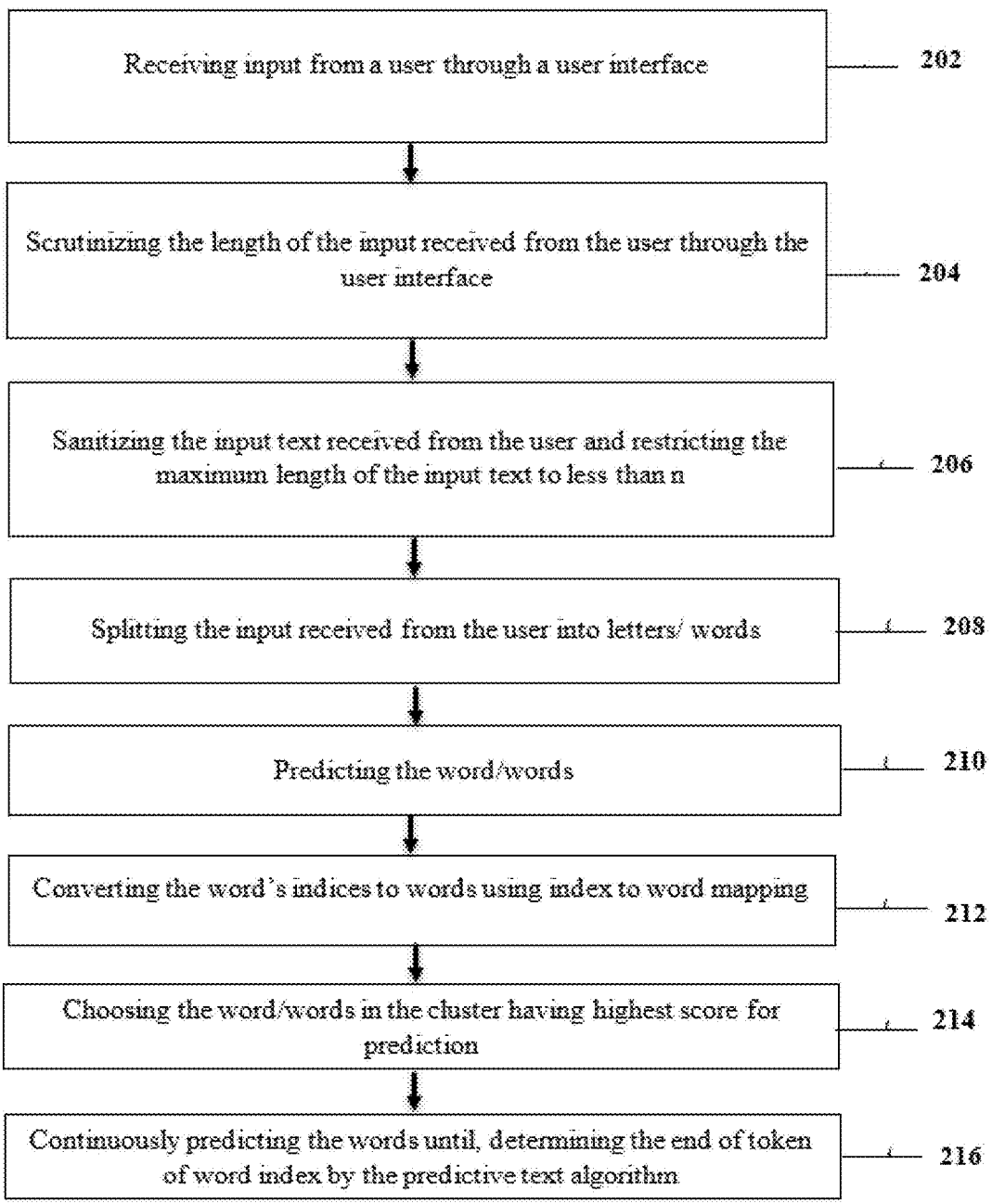
FIG. 2 illustrates a flowchart explain the process steps in a method for smart sentence completion/prediction, according to an embodiment herein.

FIG. 2 illustrates a flowchart on method for smart sentence completion, according to one embodiment herein. FIG. 2 represents a method for smart sentence completion 200, wherein the smart sentence completion is achieved by means of smart sentence composer comprising the steps of receiving input from a user through a user interface 202, wherein the user interface is a keyboard comprising English/English-Hindi layout. Scrutinizing the length of the input received from the user through the user interface 204 by smart sentence composer, such that if the length of the input is greater that one word the predictive text algorithm of smart sentence composer proceeds to the next step, if not the predictive text algorithm goes back to the previous step of requesting the input from the user. Sanitizing the input text received from the user and restricting the maximum length of the input text to less than n (206), wherein n is the maximum length of the input the user can provide. The restriction of maximum length of the input from the user is decided according to optimized inference times. Splitting the input received from the user into letters/words 208. Predicting the word/words 210 by the smart sentence composer, wherein the smart sentence composer predicts cluster of most probable word's indices. The cluster consist of word's indices, such that the word's indices have a similarity above a decided threshold. Furthermore, the method for sentence completion includes converting the word's indices to words using index to word mapping 212. Choosing the word/words in the cluster having highest score for prediction 214. The frequently used word/words are present in personalized dictionary of the smart sentence composer. While choosing the word/words those word/words present in the personalized dictionary is given preference over other. Further, continuously predicting the words until, determining the end of token of word index by the predictive text algorithm 216 of the smart sentence composer. If yes, then the predictive text algorithm proceeds to the final step of completing the sentence prediction. If not, the predictive text algorithm prompts the word/words appended with input by the user to the step of text tokenization or sanitizing the input text.

Figure 3:
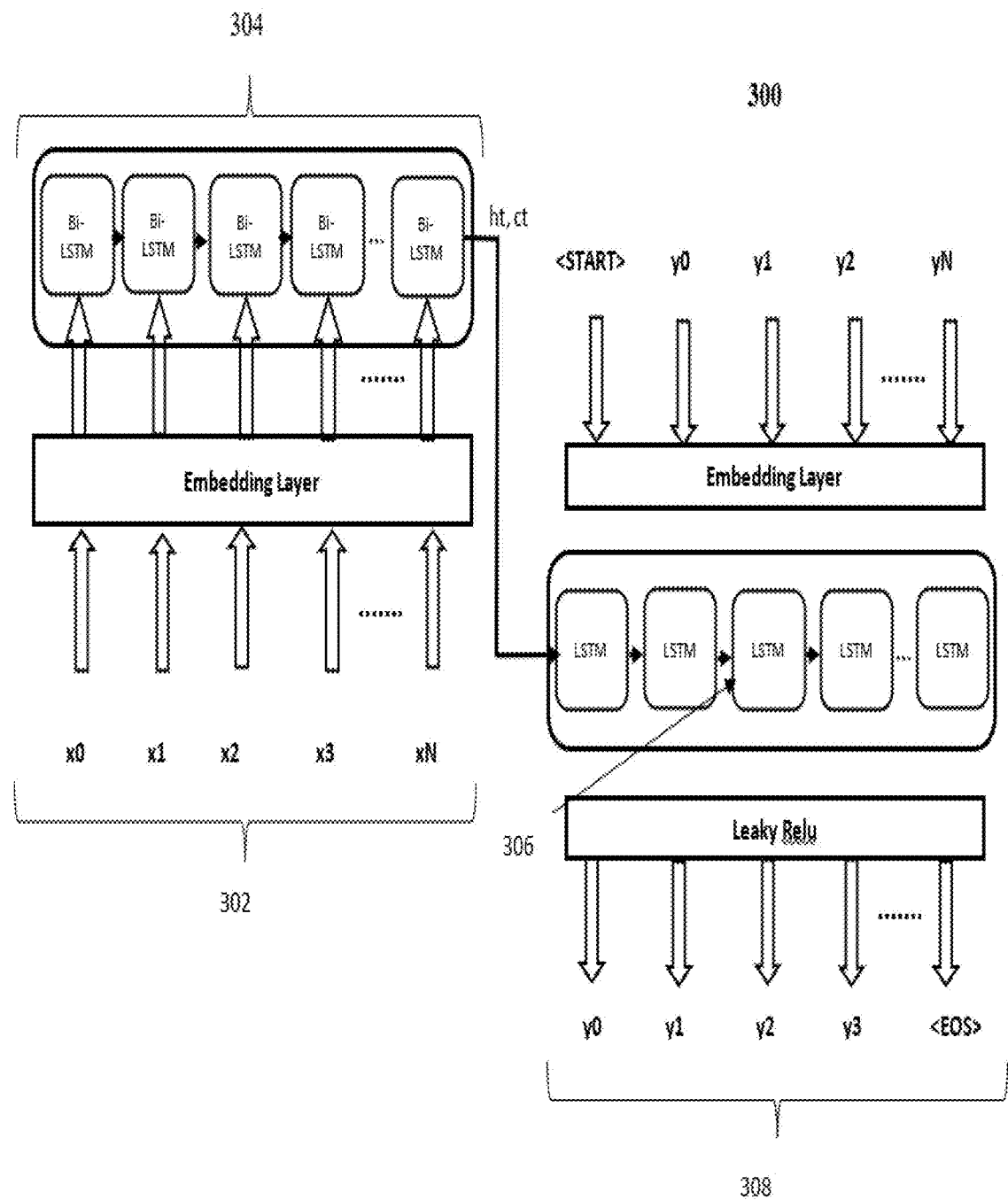
FIG. 3 illustrates a model architecture on predictive text algorithm using LSTM and Bi-LSTM, according to an embodiment herein.

FIG. 3 illustrates a model architecture on predictive text algorithm using LSTM and Bi-LSTM, according to one embodiment herein. With respect to FIG. 3 represents the model architecture 300 on predictive text algorithm using LSTM (Long Short-Term Memory) and Bi-LSTM (Bi-directional Long Short-Term Memory). In the model architecture 300, one or more inputs 302 includes x0, x1 . . . xN. The length of the input array depends on the maximum length allowed while designing the model architecture 300. Longer the "N", longer context can be deciphered. However, the inference time should be considered while deciphering the context. Hence, when one or more input 302 is given, plurality of Bi-LSTM cells 304 gets triggered, for that reason the maximum length of the one or more input is optimized thereby the inference time is in a modest limit. When the plurality or Bi-LSTM or encoder cells 304 is fed in with the input 302 sequence, over time the plurality of encoder cells 304 encapsulates all the information and stores the information in final internal states such as $h_t$ (hidden state) and $c_t$ (cell state). The final internal states are then passed onto one or more decoder cells 306, wherein the one or more decoder cells 306 tries to produce one or more target sequence 308. The one or more target sequence 308 includes y0, y1, y2, . . . yn. The initial state of the one or more decoder cells 306 are set to final states ($h_t$, $c_t$) of encoder cells 304. Hence, the encoder cells 304 function as a context vector and helps the one or more decoder cells 306 to produce the one or more desired target sequence 308. Therefore, both encoder and decoder are LSTM models or sometimes called GRU models. In addition, the encoder cell 304 reads the one or more input sequence 302 and summarizes the information in the internal state vectors or context vector (in case of LSTM or decoder these are called the hidden state and cell state vectors). Hence, the outputs of the encoder cell 304 is discarded and only the internal states are preserved. The context vector aims to encapsulate the information for all input elements in order to help the decoder to make accurate predictions. Apparently, the one or more decoder cells 306 is an LSTM whose initial states are initialized to the final states of the Encoder 304 LSTM, i.e., the context vector of the encoder's final cell is input to the first cell of the decoder network. Therefore, by utilizing the initial states, the decoder starts generating the output sequence or one or more target sequence 308, and the output sequence 308 is then further taken into consideration for future outputs. The model architecture 300 has a stack of several LSTM units where each LSTM unit predicts an output yt at a time step t. Each recurrent unit in the decoder accepts a hidden state from the previous unit and produces an output as well as its own hidden state.

Figure 4:
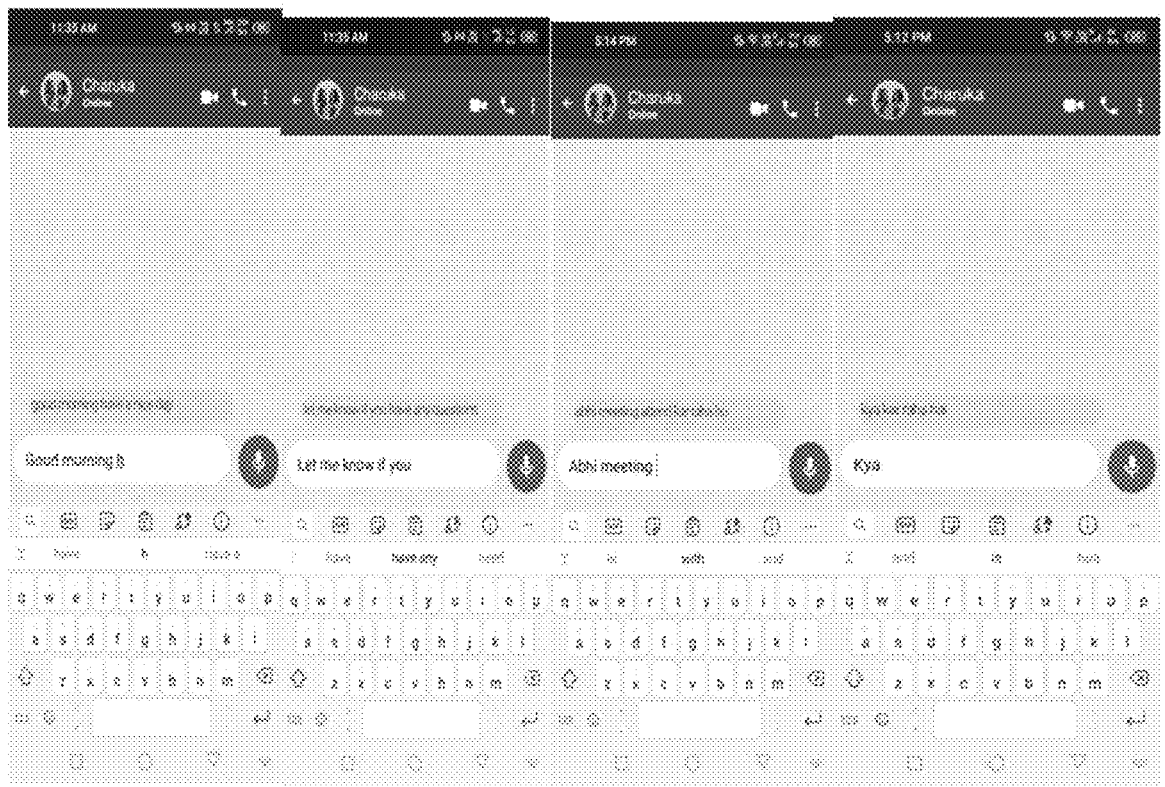
FIG. 4 illustrates a screenshot of smart sentence completion integrated with chatting application for textual communication, according to an embodiment herein.
Figure 4:
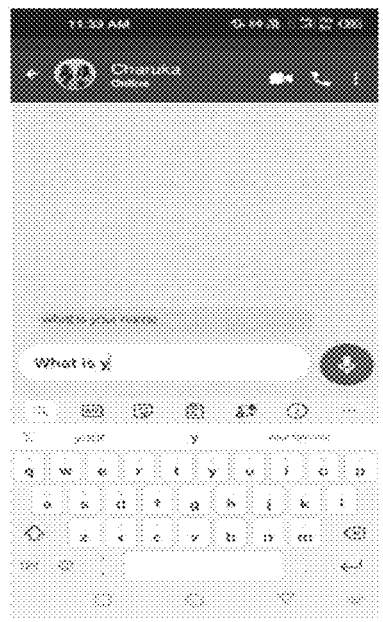

FIG. 4 illustrates a screenshot of smart sentence completion integrated with chatting application for textual communication, according to one embodiment herein. The screen shot illustrates the smart sentence composer integrated with mobile device on chatting application such as WhatsApp.

The present invention may be more clearly understood with reference to the following example of the invention which are given by way of example only. One has to consider that the following examples are included to demonstrate certain non-limiting aspects of the invention. It should be appreciated by those of skill in the art that the techniques disclosed in the examples which follow represent techniques discovered by the inventor to function well in the practice of the invention. However, those of skill in the art should, in light of the present disclosure, appreciate that many changes can be made in the specific embodiments which are disclosed and still obtain a like or similar result without departing from the spirit and scope of the invention.

Example 1

The Table 1 below describes the input given by the user and the corresponding obtained using the system and method for smart sentence completion in a mobile device.

| Input | Output |
|---|---|
| <start> wi <end> | <start> ll speak to you on <end> |
| <start> wil <end> | <start> l speak to you on <end> |
| <start> will <end> | <start> speak to you on <end> |
| <start> will <end> | <start> speak to you on <end> |
| <start> will s <end> | <start> peak to you on <end> |
| <start> will sp <end> | <start> eak to you on <end> |
| <start> will spe <end> | <start> ak to you on <end> |
| <start> will spea <end> | <start> k to you on <end> |
| <start> will speak <end> | <start> to you on <end> |
| <start> will speak <end> | <start> to you on <end> |
| <start> will speak t <end> | <start> o you on <end> |
| <start> will speak to <end> | <start> you on <end> |
| <start> will speak to <end> | <start> you on <end> |
| <start> will speak to y <end> | <start> ou on <end> |
| <start> will speak to yo <end> | <start> u on <end> |
| <start> will speak to you <end> | <start> on <end> |
| <start> will speak to you <end> | <start> on <end> |
| <start> will speak to you o <end> | <start> n <end> |
| <start> will speak to you on <end> | <start> <end> |
| <start> di <end> | <start> n ki hi to bt <end> |
| <start> din <end> | <start> ki hi to bt <end> |
| <start> din <end> | <start> ki hi to bt <end> |
| <start> din k <end> | <start> i hi to bt <end> |
| <start> din ki <end> | <start> hi to bt <end> |
| <start> din ki <end> | <start> hi to bt <end> |
| <start> din ki h <end> | <start> i to bt <end> |
| <start> din ki hi <end> | <start> to bt <end> |
| <start> din ki hi <end> | <start> to bt <end> |
| <start> din ki hi t <end> | <start> o bt <end> |
| <start> din ki hi to <end> | <start> bt <end> |
| <start> din ki hi to <end> | <start> bt <end> |
| <start> din ki hi to b <end> | <start> t <end> |
| <start> din ki hi to bt <end> | <start> <end> |
| <start> ki <end> | <start> hi to bt h <end> |
| <start> ki <end> | <start> hi to bt h <end> |
| <start> ki h <end> | <start> i to bt h <end> |
| <start> ki hi <end> | <start> to bt h <end> |
| <start> ki hi <end> | <start> to bt h <end> |
| <start> ki hi t <end> | <start> o bt h <end> |
| <start> ki hi to <end> | <start> bt h <end> |
| <start> ki hi to <end> | <start> bt h <end> |
| <start> ki hi to b <end> | <start> t h <end> |
| <start> ki hi to bt <end> | <start> h <end> |
| <start> ki hi to bt <end> | <start> h <end> |
| <start> ki hi to bt h <end> | <start> <end> |

The various embodiments of the present invention provide a system and method for smart sentence completion.

The main advantage of the system and method for smart sentence completion is that the system can be implemented in on-device support for sentence completion across all messaging, chatting and all those platforms which require one to type and maintain longer context. Although, there exist word prediction and suggestions, sentence completion involves maintaining longer context and predicting multiple words, in an attempt to complete the sentence. Further, the system and method for smart sentence completion can be used in mobile device with reduced size about <5 MB and latency requirement 50-60 ms. Hence, the model architecture for smart sentence completion can handle long context and yet be light weight. Furthermore, the system and method for smart sentence completion finds application in various textual and visual communication medium, such as chatting applications, virtual text input method such as keyboard, social networking applications and operating systems.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

We claim:

1. A method for sentence completion in an edge device, the method comprises steps of:
   receiving an input text from a user through a user interface (202), wherein the user interface is a keyboard comprising English and English-Hindi layout;
   scrutinizing a length of the input text received from the user through the user interface (204) by a smart sentence composer;
   sanitizing the input text received from the user and restricting the length of the input text to less than n for restricting the length of the input text provided by the user is decided according to optimized inference times;
   determining an inference time considered while deciphering a context for predicting probable words, and wherein the length of the input words depends on the threshold preset length, and wherein a longer context is deciphered, when the length of the input text is higher;
   splitting the input text received from the user into letters/words (208);
   predicting one or more words by the smart sentence composer (210), and wherein the smart sentence composer is configured to predict a cluster of probable word's indices, and wherein the cluster consists of word's indices, and wherein the wherein the number of word's indices have a similarity above a decided threshold number;
   converting the word's indices to words using index to word mapping (212);
   choosing the word/words in the cluster having highest maximum score for prediction (214);
characterized in that:
   wherein a word/words that are used often and present in personalized dictionary of the smart sentence composer is selected, while choosing the word/words, and wherein the word/words that are present in the personalized dictionary is selected over other words, and wherein the words are continuously predicted until determining the end of token of word index is determined by a predictive text model loaded in of the smart sentence composer (216), and wherein the predictive text model is used for completing the sentence prediction, when the end of token of word index is determined, and wherein the predictive text model is used for prompting the word/words appended with input by the user to a step of text tokenization or sanitizing the input text, and wherein a plurality of (Bi-directional Long Short-Term Memory) cells (304) is triggered by optimizing the length of the one or more input to be within a threshold length, for adjusting/modifying the inference time, when one or more inputs (302) are given, and wherein the smart sentence composer comprises an in-built language module, and wherein the language module has an in-built intelligence to validate the sentences with correct grammar structure, and wherein the sentences were tagged by a team of annotators, to validate the correct grammar sentences, and wherein the sentences, which is grammatically correct, are tagged by the team of annotators, and wherein the sentences found with syntax and semantics errors are tagged and are also corrected, wherein the language module are tested/evaluated after annotation and improvised to understand the word morphology, sentence structure and language nuances, and wherein the improvised language module is then embedded in a dense layer of the smart sentence composer, and the output from the smart sentence composer passed through the dense layer gave probability to the n-grams/sentences that are deemed fit grammatically.

2. The method as claimed in claim 1, wherein the smart sentence composer checks, whether the length of the input is greater than one word for proceeding to a next step and wherein the sentence composer uses the predictive text model to proceed to the next step, when the length of the input is greater than one word, and wherein the sentence composer goes back to a previous step of requesting the input from the user, when the length of the input is not greater than one word if not the predictive text algorithm.

3. The method as claimed in claim 1, wherein predictive text model (300) on the smart sentence composer uses Long Short-Term Memory (LSTM) and Bidirectional Long Short-Term Memoly (Bi-LSTM).

4. The method as claimed in claim 1 comprises:
   feeding the plurality of Bi-LSTM cells or a plurality of encoder cells (304) with the input 302 sequence:
   encapsulating all the information over time with the plurality of encoder cells (304);
   storing the encapsulated information in final internal states known as ht (hidden state) and Ct (cell state);
   passing the final internal states onto one or more decoder cells (306) to produce one or more target sequence (308), and wherein the one or more target sequence (308) includes a series of outputs, and wherein the initial state of the one or more decoder cells (306) are set to the final states (hl, Ct) of the plurality of encoder cells (304), and wherein the plurality of encoder cells (304) act as a context vector and helps the one or more decoder cells (306) to produce a one or more desired target sequence (308), and wherein both the plurality of encoder cells and the one or more decoder cells are LSTM models or GRU models.

5. The method as claimed in claim 4, wherein the plurality of encoder cells (304) reads the one or more input sequence (302) and summarizes the information in an internal state vectors or a context vector, and wherein the internal state vectors or the context vector are called a hidden state and cell state vector in case of a LSTM decoder, and wherein outputs of the plurality of encoder cells 304 are discarded and only internal states are preserved/stored, and wherein the context vector is used to encapsulate information for all input elements in order to make the one or more decoder cells to make accurate predictions.

6. The method as claimed in claim 5, wherein the one or more decoder cells (306) is an LSTM whose initial states are initialized to the final states of the plurality of encoder cells (304), and wherein the LSTM, or the context vector of a final cell in the plurality of encoder cells is input to a first cell of the one or more decoder cells, and wherein the one or more decoder cells generates an output sequence or one or more target sequence (308), by utilizing initial states of LSTM, and wherein an output sequence (308) is then further used/ considered for future outputs.

7. The method as claimed in claim 1, wherein the model has a stack of several LSTM units and wherein each LSTM unit predicts an output yt at a time step t, and wherein each recurrent unit in the one or more decoder cells accepts the hidden state from a previous unit and produces an output as well as its own hidden state.

* * * * *